United States Patent

Grüning

[11] Patent Number: 5,805,437
[45] Date of Patent: Sep. 8, 1998

[54] POWER ELECTRONIC CIRCUIT ARRANGEMENT HAVING PLURAL POWER CONVERTERS

[75] Inventor: Horst Grüning, Wettingen, Switzerland

[73] Assignee: Asea Brown Boveri AG, Baden, Switzerland

[21] Appl. No.: 831,496

[22] Filed: Mar. 31, 1997

[30] Foreign Application Priority Data

Apr. 20, 1996 [DE] Germany .................. 196 15 855.9

[51] Int. Cl.$^6$ .................................................. H02M 7/537
[52] U.S. Cl. .................................................. 363/71; 363/43
[58] Field of Search .......................... 363/43, 63, 65, 363/71, 129, 132, 136; 307/82, 45; 327/129

[56] References Cited

U.S. PATENT DOCUMENTS

| 3,581,212 | 5/1971 | McMurray | 327/105 |
| 3,896,365 | 7/1975 | Corry | 363/43 |
| 3,919,619 | 11/1975 | Corry | 363/71 |
| 4,052,657 | 10/1977 | Kleiner et al. | 363/43 |
| 4,161,771 | 7/1979 | Bates | 363/43 |

FOREIGN PATENT DOCUMENTS

| 4321988A1 | 1/1994 | Germany . |
| 19526359A1 | 2/1996 | Germany . |
| 19535552A1 | 4/1996 | Germany . |
| 62-217855A | 9/1987 | Japan . |

OTHER PUBLICATIONS

"Transistorwechselrichter fur Nahverkehrstriebfahrzeuge", Teitze, et al., Elektrische Bahnen 91 (1993), pp. 341–347 Not Translated.

"Simple Topologies for Single Phase AC Line Conditioning", Chen, et al., IEEE Transactions on Industry Applications, vol. 30, No. 2, Mar./Apr. 1994, pp. 406–412.

"Moderne Leistungshalbleiter in der Stromrichtertechnik", Bosterling, et al., etz Bd. 114 (1993), pp. 1310–1319 Not Translated.

*Primary Examiner*—Peter S. Wong
*Assistant Examiner*—Shawn Riley
*Attorney, Agent, or Firm*—Burns, Doane, Swecker & Mathis, L.L.P.

[57] ABSTRACT

A power electronic circuit arrangement which comprises a first power converter is specified. A second power converter is connected between the load terminals of the first power converter and a load. The negative or positive values of the DC voltage intermediate circuits of the first and second power converters can be added by means of corresponding driving of the power converters. This achieves finer voltage gradation and, consequently, an improved approximation of the resulting output voltage to the sinusoidal waveform.

10 Claims, 2 Drawing Sheets

POWER ELECTRONIC CIRCUIT ARRANGEMENT HAVING PLURAL POWER CONVERTERS

BACKGROUND OF THE INVENTION

1. Field of the Invention

The invention relates to the field of power electronics. It is based on a power electronic circuit arrangement.

2. Discussion of Background

Such a circuit arrangement has already been described, for example, in the article "Moderne Leistungshalbleiter in der Stromrichtertechnik" [Modern Power Semiconductors in Power Converter Technology], etz Vol. 114 (1993) Issue 21, by W. Bölsterling, H. Ludwig, G. Schulze and M. Tscharn.

Particularly in drive technology, the aim of these power electronic circuit arrangements is to produce variable-frequency voltage profiles which are as sinusoidal as possible. One solution presented for this purpose, for example, is the principle of the converter, which forms a DC voltage from an AC mains and, with the aid of an invertor, once again produces from this DC voltage an AC voltage, for example of variable frequency. The AC voltage is usually produced by pulse duration modulation of the DC voltage. Two-point invertor concepts exist wherein the AC voltage can assume only two states, namely either a positive or a negative voltage, and three-point invertor concepts also exist wherein the AC voltage can assume three states, namely a positive voltage, a negative voltage and also 0 V. The AC voltage can also be produced, using a three-point invertor, by step-by-step approximation of the sinusoidal profile with the three voltage levels. However, this solution only yields an approximation of the output voltage to the sinusoidal waveform which is very inaccurate and hence afflicted by harmonics, which is problematical particularly with regard to the increased requirements concerning purity of the power supply.

SUMMARY OF THE INVENTION

Accordingly, one object of the invention is to provide a novel power electronic circuit arrangement with which it is possible to achieve an improved sine approximation.

The core of the invention, then, is that a second power converter is provided which is connected to each load terminal of a first power converter and is connected upstream of a load in such a way that at least the positive intermediate circuit voltage +Uzk2 or the negative intermediate circuit voltage −Uzk2 or, if appropriate, 0 V can optionally be added to a voltage value which is switched by the first power converter to the load terminal thereof.

A substantially finer gradation can therefore be achieved by means of a circuit arrangement according to the invention than in the prior art, with the result that the sinusoidal waveform is better approximated.

The first power converters can have the form of a two-point invertor or a three-point invertor. Preferably, the first power converter also has a polyphase structure and, for each phase, a second power converter is connected to the load terminal and is connected upstream of the load. The second power converter preferably has the structure of a bridge circuit with two bridge paths. The first bridge path is connected to the load terminal of the first power converter and is constructed after the manner of a two-point invertor. The second bridge path is connected to the first bridge path via a DC voltage intermediate circuit and is constructed after the manner of a two-point or three-point invertor. The load terminal of the second bridge path is then connected to the load. In addition, a filter may be provided between the load and the load terminal of the second bridge path.

Further exemplary embodiments emerge from the corresponding dependent claims.

The advantage of the structure according to the invention consists in the fact that more voltage levels are available than in the prior art, thereby achieving an improved approximation of the sinusoidal waveform, together with all its advantages.

BRIEF DESCRIPTION OF THE DRAWINGS

A more complete appreciation of the invention and many, of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
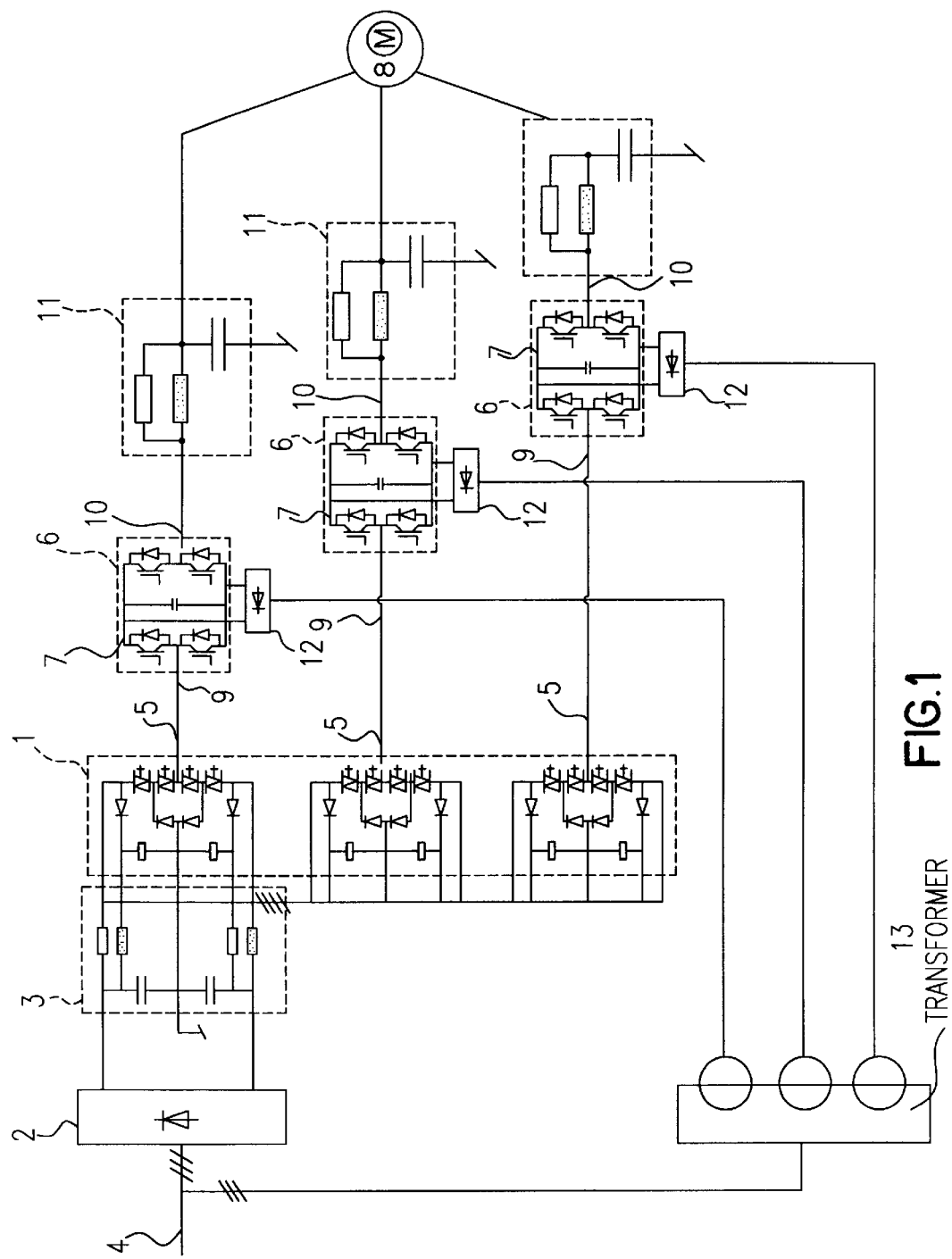
FIG. 1 shows a circuit diagram of a circuit arrangement according to the invention.

Referring now to the drawings, wherein reference numerals designate identical or corresponding parts throughout the several views, FIG. 1 shows a circuit diagram of a circuit arrangement according to the invention. 1 designates a first power converter, which is connected via a first rectifier 2 and a first DC voltage intermediate circuit 3 to a power supply system 4. The first DC voltage intermediate circuit 3 has a voltage Uzk1. The power converter 1 is designed as a three-phase three-point invertor in this exemplary embodiment. The phases are connected to the first DC voltage intermediate circuit 3, which is fed by the power supply system 4 via the first rectifier 2.

Second power converters 6 are connected to the load terminals 5 of the first power converter 1. In the exemplary embodiment according to FIG. 1, the second power converters 6 comprise two bridge paths having a first and second bridge terminal 9 and 10. The first bridge terminal 9 is connected to the respective load terminal 5 of the first power converter 1, while the second bridge terminal 10 is connected via a filter 11, which is interposed should the need arise, to the terminals of a load 8, for example of a three-phase motor. A second DC voltage intermediate circuit 7 having a voltage Uzk2 is provided between the bridge paths of the second power converters 6. This second DC voltage intermediate circuit is formed by a capacitor which is fed by a second rectifier 12.

The circuit arrangement according to FIG. 1 functions as follows:

either the positive intermediate circuit voltage +Uzk1, the negative −Uzk1 or 0 volts can be switched to the load terminals 5 by means of corresponding driving, assumed to be known, of the semiconductor switches of the first power converter 1. This voltage can then have added to it, by means of corresponding driving, likewise assumed to be known, of the semiconductor switches of the second power converter 6, the positive second intermediate voltage Uzk2, 0 volts or the negative −Uzk2.

Figure 3:
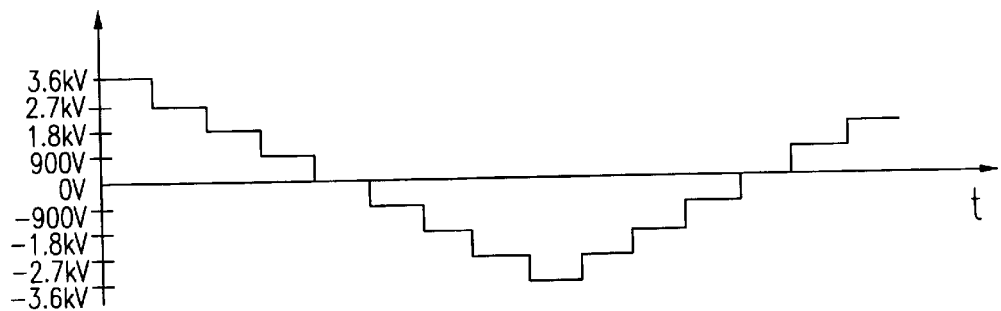
FIG. 3 shows the time sequence of a possible output voltage of a circuit according to FIG. 1.

In the exemplary case of rating the first intermediate circuit 3 at 2.7 kV and the second intermediate circuit 7 at 100 V, an approximately sinusoidal voltage curve, as is illustrated in FIG. 3, can consequently be produced by means of corresponding driving of the first and second power converters. For this purpose, the power converters 1 and 6 are driven as follows:

| 1st power converter | 2nd power converter | Resulting voltage |
|---|---|---|
| 2.7 kV | 900 V | 3.6 kV |
| 2.7 kV | 0 V | 2.7 kV |
| 2.7 kV | −900 V | 1.8 kV |
| 0 V | 900 V | 900 V |
| 0 V | 0 V | 0 V |
| 0 V | −900 V | −900 V |
| −2.7 kV | 900 V | −1.8 kV |
| −2.7 kV | 0 V | −2.7 kV |
| −2.7 kV | −900 V | −3.6 kV |

The second power converter 2 is therefore clocked at a higher frequency than the first.

Figure 2:
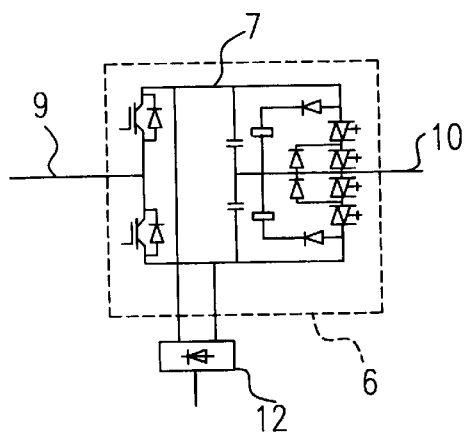
FIG. 2 shows a variant of the second power converter.
Figure 4:
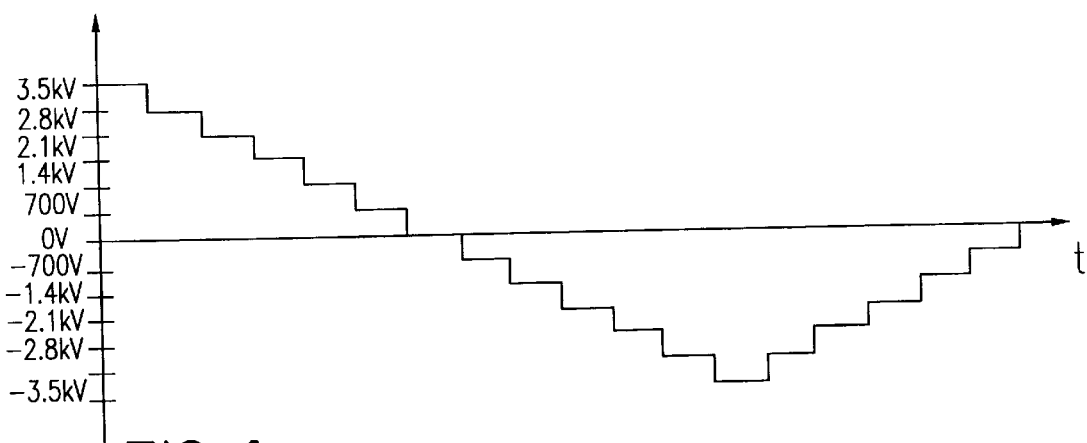
FIG. 4 shows the time sequence of a possible output voltage of a circuit having two power converters according to FIG. 2.

The second bridge path 10 of the second power converter 6 may also be constructed after the manner of a three-point invertor path (FIG. 2). A particularly preferred embodiment is illustrated in this figure; this permits no power flow from the load 8 in the direction of the power supply system 4, yet has a simple structure. This exemplary embodiment permits even finer gradation than that according to FIG. 1, since now it is possible even to add only half of the positive or negative second intermediate circuit voltage Uzk2 to the first Uzk1. For this purpose, the second intermediate circuit voltage Uzk2 may be, for example 2×700 V=1400 V and the first may be 2.1 kV. In this case, the power converters are driven, for example, as follows (cf. FIG. 4):

| 1st power converter | 2nd power converter | Resulting Voltage |
|---|---|---|
| 2.1 kV | 1.4 kV | 3.5 kV |
| 2.1 kV | 700 V | 2.8 kV |
| 2.1 kV | 0 V | 2.1 kV |
| 2.1 kV | −700 V* | 1.4 kV |
| or 0 V | 1.4 kV | |
| 0 V | 700 V | 700 V |
| 0 V | 0 V | 0 V |
| 0 V | −700 V | −700 V |
| 0 V | −1.4 kV | −1.4 kV |
| or −2.1 kV | 700 V* | |
| −2.1 kV | 0 V | −2.1 kV |
| −2.1 kV | −700 V | −2.8 kV |
| −2.1 kV | −1.4 kV | −3.5 kV |

In order to avoid any power feedback from the power converter 1 to the power converter 6, or the intermediate circuit 7 thereof, the possibilities marked by * are not selected. The voltage across the capacitor of the second intermediate circuit 7 would otherwise assume impermissible high values over the course of time.

Figure 5:
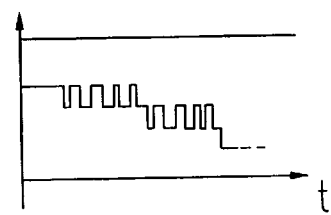
FIG. 5 shows a detail of an output voltage having a further improved sine approximation.

A further improved approximation of the sinusoidal waveform is achieved by intermediately clocking the switches of the second power converter 6 (FIG. 5). Intermediate clocking of the first and/or second power converter is also conceivable.

The second intermediate circuit 7 can be fed by just one AC phase with a bridge rectifier or by three AC phases with a three-phase rectifier bridge. The first variant has the advantage that windings of the transformer 13 can be saved.

As a further variant of the circuit arrangement according to the invention, a converter bridge can be used instead of the rectifier 12. As a result, the second power converter 6 is capable of feedback and four-quadrant operation becomes possible. If, moreover, the rectifier 2 is designed appropriately, a circuit arrangement is obtained which constitutes a converter having complete feedback capability. As a result, on the one hand, the states marked by * in the above table can also be selected. On the other hand, however, it is also possible to drive the converter bridges 12 in such a way that they take up, via the transformer 13, reactive current and/or harmonic currents from the power supply system 4. This enables the harmonics produced by the rectifier 2 to be largely compensated for. This has the advantage that a cost-effective rectifier equipped, for example, with diodes in a six-pulse circuit can be used as the rectifier 2.

Overall, then, the invention provides a power electronic circuit arrangement with which it is possible to achieve an improved approximation of the sinusoidal waveform.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A power electronic circuit arrangement, comprising:
   a first power converter which is connected via a first DC voltage intermediate circuit, having a first intermediate circuit voltage Uzk1, and a first rectifier to a power supply system and which has at least one load terminal switchable between a positive first intermediate circuit voltage +Uzk1, a negative first intermediate circuit voltage −Uzk1 and 0V; and
   at least one second power converter which has a second DC voltage intermediate circuit having a second intermediate circuit voltage Uzk2 and which is connected to each load terminal of the first power converter and is connected upstream of a load such that at least one of a positive second intermediate circuit voltage +Uzk2, a negative second intermediate circuit voltage −Uzk2 and 0 V can optionally be added to a voltage value which is switched by the first power converter to the at least one load terminal.

2. The circuit arrangement as claimed in claim 1, wherein the first power converter comprises a three-phase two-point invertor and three load terminals.

3. The circuit arrangement as claimed in claim 1, wherein the first power converter comprises a three-phase three-point invertor and three load terminals.

4. The circuit arrangement as claimed in claim 1, wherein each second power converter comprises a bridge circuit which is fed by a second rectifier and has a first and a second bridge path and, correspondingly, a first and a second bridge terminal, the first bridge terminal being connected to the at least one load terminal of the first power converter and the second bridge terminal being connected to the load.

5. The circuit arrangement as claimed in claim 4, wherein the first bridge path and the second bridge path are constructed as a two-point invertor.

6. The circuit arrangement as claimed in claim 4, wherein the first bridge path is constructed as a two-point invertor and the second bridge path is constructed as a three-point invertor.

7. The circuit arrangement as claimed in claim 4, wherein the second bridge terminal is connected via a filter to a neutral point of potential of the first power converter.

8. The circuit arrangement as claimed in claim 4, wherein the second rectifier is connected via a transformer to the power supply system.

9. The circuit arrangement as claimed in claim 1, wherein the at least one second power converter is operated with pulse duration modulation.

10. The circuit arrangement as claimed in claim 4, wherein the first rectifier and the second rectifier are each constructed as a converter bridge, and wherein the second rectifier is driven such that harmonics in the power supply system are compensated.

* * * * *